United Sta[tes Patent] [11] 3,607,322

[72] Inventors William C. Brady
Granville;
Ralph L. Tiede, Granville; Folsom M. Veazie, Granville; Warren W. Wolf, Columbus, all of Ohio
[21] Appl. No. 827,056
[22] Filed May 22, 1969
[45] Patented Sept. 21, 1971
[73] Assignee Owens-Corning Fiberglas Corporation

[54] LIGHT TRANSMITTING GLASS FIBERS, CORE AND CLADDING GLASS COMPOSITIONS
22 Claims, No Drawings
[52] U.S. Cl. .................................................. 106/54, 106/50, 350/96 B, 350/96 R
[51] Int. Cl. ........................................................ C03c 13/00, C03c 3/10
[50] Field of Search ............................................ 106/50, 54; 350/96 B, 96 R

[56] References Cited
UNITED STATES PATENTS
3,413,133 11/1968 Stalego ........................ 106/50
3,494,354 2/1970 Kokuta et al. ................ 106/50 X
3,508,939 4/1970 Laurent ........................ 350/96 B
FOREIGN PATENTS
1,518,830 2/1968 France
OTHER REFERENCES
Morey, The Properties of Glass, 2nd ed. 1954 page 425

*Primary Examiner*—Helen M. McCarthy
*Attorneys*—Staelin and Overman and Thomas R. Schuman ABSTRACT: Glass compositions are disclosed for use in producing light transmitting glass fibers composed of a central core glass surrounded by an outer cladding glass. The core glasses have the following range of proportions (by weight): $SiO_2$, 23–41%; $Al_2O_3$, 7–10%; $B_2O_3$, 2.5–11%; $K_2O$, up to 10%; $BaO$, 34–59%; $Sb_2O_3$, up to 0.05%, preferably 0.01 to 0.05%. The cladding glasses have the following range of proportions (by weight): $SiO_2$, 61–65%; $Al_2O_3$, 4–6%; $CaO$, up to 3%; $MgO$, 0.90–4%; $B_2O_3$, 12–16%; $Na_2O$, 7–12%; $Li_2O$, up to 4%; $F_2$, up to 3%; $SeO_2$ up to 0.004%, preferably 0.002 to 0.004%.

3,607,322

LIGHT TRANSMITTING GLASS FIBERS, CORE AND CLADDING GLASS COMPOSITIONS

Background of the Invention

This invention concerns the field of fiber optics wherein light is transmitted from one point to another via small diameter fibers composed of a central core and an outer cladding or sheath. More specifically, this invention relates to optical fibers made of glass and particular core and cladding glass compositions.

In the fiber optics field, a number of individual fibers or filaments are bundled together to form what the art refers to as a light pipe or fiber optic array. The optical fibers used to produce light pipes are flexible and therefore capable of being curved around obstacles or being placed in remote areas where conventional lighting sources are unsafe or of limited practical value. Optical fibers have myriad uses including for example, monitoring and lighting devices in automobiles, aircraft, appliances, computers, and medical applications. Light pipes are particularly useful in applications where noncurrent carrying and therefore nonshorting or nonsparking light transmitting means are necessary or desirable due to safety considerations. One specific use contemplates light pipes running from automobile headlights and taillights to the dashboard or rear window shelf. As long as the monitored headlight or taillight is operating properly, the light pipe transmits light therefrom and indicates to the driver that the lights are functioning. If one of the lights fails, the absence of light being transmitted by the light pipe informs the driver of a malfunction. Light pipes are also useful in lighting the various dashboard panel instruments. By running light pipes from a single, easily accessible light source to the various panel instruments, the need for a large number of small, remotely located light sources is eliminated.

Light pipes may be composed of glass or plastic materials. In either case, the individual fibers or filaments are composed of two essential components, namely a central core having an index of refraction higher than an outer cladding or sheath which surrounds the core. Due to the different indices of refraction of the core and cladding materials, the principle of total internal reflection operates to reflect light entering one end of the fibers along the internal length of the fiber to its opposite end.

The concept of transmitting light from one location to another by means of total internal reflection with an optically transparent fiber or array of fibers is well known in the art. Plastic and glass materials have been found to be the most desirable materials for producing optical fibers. Glass fibers, however, due to their high heat resistance and retention of other desirable properties over long periods of time under adverse conditions are preferred. For example, where plastic fibers begin to become brittle and discolor when exposed to temperature above about 175° F. or experience a reduction in light transmission when exposed to long periods of heat and high humidity, glass light pipes continue to function at temperatures approaching 1000° F. and are unaffected by humid conditions.

Although optical glass fibers are preferred, the art has been unable to produce continuous core and cladding glass composite fibers in the quantities and at the cost required by most commercial applications. This problem centers around the fact that conventional methods of producing glass fibers have been difficult to use in producing two component optical fibers. In addition to the usual problems experienced in producing fine or small diameter fibers from a supply of molten glass, the production of optical fibers requires that the core and cladding glasses have different compositions and different indices of refraction while also having similar liquidus temperatures, viscosities, and coefficients of thermal expansion so that the core and cladding are compatible when formed into a composite fiber.

Summary of the Invention

This invention discloses core and cladding glass compositions for optical glass fibers. These glass compositions when combined into an optical fiber exhibit light transmission and physical properties required in most commercial applications while also allowing enough flexibility to be formed into two component optical fibers using conventional fiber forming techniques or fiber forming techniques adapted to produce optical fibers at commercial rates. The core glasses of this invention have the following range of proportions:

| Ingredient | by Weight |
| --- | --- |
| $SiO_2$ | 23–41 |
| $Al_2O_3$ | 7–10 |
| $B_2O_3$ | 2.5–11 |
| $K_2O$ | up to 10 |
| BaO | 34–59 |
| $Sb_2O_3$ | up to 0.05 |

The cladding or sheath glasses of this invention have the following range of proportions:

| Ingredient | Percent by Weight |
| --- | --- |
| $SiO_2$ | 61–65 |
| $Al_2O_3$ | 4–6 |
| CaO | up to 3 |
| MgO | 0.90–4 |
| $B_2O_3$ | 12–16 |
| $Na_2O$ | 7–12 |
| $Li_2O$ | up to 4 |
| $F_2$ | up to 3 |
| $SeO_2$ | up to 0.004 |

The core glasses of the above range of proportions have an index of refraction in the range of 1.56 to 1.64. The cladding glasses have an index of refraction ranging from 1.50 to 1.52.

Description of the Invention

This invention discloses core and cladding glass compositions which can be used in production of optical glass fibers. Further, these compositions make practical the mass production of optical fibers using conventional techniques of glass fiber production.

A preferred core glass composition is as follows:

| Ingredient | Percent by Weight |
| --- | --- |
| $SiO_2$ | 30–32 |
| $Al_2O_3$ | 7–8 |
| $B_2O_3$ | 2–7 |
| $K_2O$ | 5–10 |
| BaO | 46–49 |
| $Sb_2O_3$ | 0.01–0.05 |

A preferred cladding glass composition is as follows:

| Ingredient | Percent by Weight |
| --- | --- |
| $SiO_2$ | 63–65 |
| $Al_2O_3$ | 5–6 |
| CaO | 2–3 |
| MgO | 0.50–1 |
| $B_2O_3$ | 12–14 |
| $Na_2O$ | 6–8 |
| $Li_2O$ | 3–5 |
| $F_2$ | 1–2 |

Specific core glass compositions embodying the principles of this invention are set forth in the following Examples 1 through 7.

EXAMPLE 1

| Ingredient | Percent by Weight |
| --- | --- |
| $SiO_2$ | 40.36 |
| $Al_2O_3$ | 9.90 |
| $B_2O_3$ | 7.66 |
| $K_2O$ | 7.59 |
| BaO | 34.49 |
| Liquidus: 1944° F. | Refractive Index: 1.56 |

EXAMPLE 2

| Ingredient | Percent by Weight |
| --- | --- |
| $SiO_2$ | 40.69 |
| $Al_2O_3$ | 7.31 |
| $B_2O_3$ | 9.57 |
| $K_2O$ | 7.64 |
| BaO | 34.79 |
| $Sb_2O_3$ | 0.05 |
| Liquidus: 2040° F. | Refractive Index: 1.56 |
| Log Viscosity | Temp., °F. |
| 2.0 | 2370 |
| 2.5 | 2160 |
| 3.0 | 2000 |

EXAMPLE 3

| Ingredient | Percent by Weight |
| --- | --- |
| $SiO_2$ | 31.88 |
| $Al_2O_3$ | 7.97 |
| $B_2O_3$ | 6.13 |
| $K_2O$ | 6.08 |
| BaO | 47.87 |
| $Sb_2O_3$ | 0.05 |
| Liquidus: 1980° F. | Refractive Index: 1.60 |
| Coefficient of Thermal Expansion: | $97 \times 10^{17}$ in./in./° C. |
| Log Viscosity | Temp., °F. |
| 2.0 | 2290 |
| 2.5 | 2110 |
| 3.0 | 1960 |

EXAMPLE 4

| Ingredient | Percent by Weight |
| --- | --- |
| $SiO_2$ | 32.87 |
| $Al_2O_3$ | 7.81 |
| $B_2O_3$ | 10.66 |
| BaO | 48.66 |
| $Sb_2O_3$ | 0.05 |
| Liquidus: 1940° F. | Refractive Index: 1.60 |
| Log Viscosity | Temp., °F. |
| 2.0 | 2170 |
| 2.5 | 2010 |
| 3.0 | 1890 |

EXAMPLE 5

| Ingredient | Percent by Weight |
| --- | --- |
| $SiO_2$ | 32.27 |
| $Al_2O_3$ | 7.58 |

EXAMPLE 5 – Continued

| | |
| --- | --- |
| $B_2O_3$ | 2.96 |
| $K_2O$ | 10.00 |
| BaO | 47.20 |
| $Sb_2O_3$ | 0.05 |
| Liquidus: 2230° F. | Refractive Index: 1.60 |
| Log Viscosity | Temp., °F. |
| 2.0 | 2330 |
| 2.5 | 2130 |
| 3.0 | 1970 |

EXAMPLE 6

| Ingredient | Percent by Weight |
| --- | --- |
| $SiO_2$ | 27.80 |
| $Al_2O_3$ | 8.37 |
| $B_2O_3$ | 10.01 |
| $K_2O$ | 0.26 |
| BaO | 53.55 |
| $Sb_2O_3$ | 0.05 |
| Liquidus: 2049° F. | Refractive Index: 1.62 |
| Log Viscosity | Temp., °F. |
| 2.0 | 2080 |
| 2.5 | 1950 |
| 3.0 | 1820 |

EXAMPLE 7

| | |
| --- | --- |
| $SiO_2$ | 23.58 |
| $Al_2O_3$ | 7.98 |
| $B_2O_3$ | 9.55 |
| $K_2O$ | 0.26 |
| BaO | 58.62 |
| $Sb_2O_3$ | 0.01 |
| Liquidus: 2043° F. | Refractive Index: 1.64 |
| Log Viscosity | Temp., °F. |
| 2.0 | 1965 |
| 2.5 | 1835 |
| 3.0 | 1735 |

In each of the above core glasses, Examples 1–7, the oxides of Cr, Cu, Fe and Mn, collectively, account for less than 0.05 percent by weight of each glass composition. These oxides enter the glass compositions as impurities and if present in collective amounts totaling more than 0.05 percent by weight the percentage of light transmitted by an optical fiber containing them decreases rapidly. This reduction of light transmission is believed due to the absorption of light by the oxides.

Additions of antimony oxide ($Sb_2O_3$) to the core glass compositions of this invention have been found to be effective in most cases in improving light transmission. The exact reason for this beneficial effect is not presently known but it is theorized that $Sb_2O_3$ reacts with one or more of the Cr, Cu, Fe, and Mn oxides in a manner which masks their harmful effects. If methods are used to control the amounts of the Cr, Cu, Fe and Mn oxides below the 0.05 percent level, the addition of $Sb_2O_3$ may not be required. However to avoid the expense and expenditure of time involved in so screening these impurities, it is found preferable to add $Sb_2O_3$ to core glass compositions in amounts ranging from 0.01 to 0.05 percent by weight (of core glass composition). Although amounts of $Sb_2O_3$ in excess of 0.05 percent by weight may be added to the core glass, no appreciable improvement in light transmission over that at the 0.01–0.05 percent level is attained. Additions of less than 0.01 percent by weight of $Sb_2O_3$ have been found to be ineffective in improving light transmission.

The upper limit of silica ($SiO_2$) content in the core glass compositions is about 41 percent by weight. Amounts of silica in excess of this 41 percent level cause seed formation in the glass while it is in the molten state. Since seeds can be attributed to an increase in the incidence of breakage of fibers while they are being formed, it is preferred to maintain the silica level at or below the 41 percent upper limit.

Baria (BaO) content of core glasses is also important. If less than 34 percent by weight of baria is used, the refractive index of the glass is lowered to the point where the amount of light transmitted by the optical fiber is insufficient for most commercial applications.

The stated amounts of $Al_2O_3$, $B_2O_3$ and $K_2O$ are included in the core glass compositions principally to control liquidus. As indicated in Example 4, $K_2O$ may be eliminated if replaced by $B_2O_3$. In this regard, it has been found that the collective $B_2O_3$ and $K_2O$ content in core glass compositions should be in the range of 9.5 to 15.5 percent by weight.

Cladding or sheath glass compositions which can be used with the core glasses set forth in Examples 1 through 7 are set forth in the following Examples 8 through 14.

EXAMPLE 8

| Ingredient | Percent by Weight |
|---|---|
| $SiO_2$ | 64.98 |
| $Al_2O_3$ | 5.53 |
| CaO | 2.72 |
| MgO | 0.99 |
| $B_2O_3$ | 12.89 |
| $Na_2O$ | 7.36 |
| $Li_2O$ | 3.68 |
| $F_2$ | 1.84 |
| Liquidus: 1930° F. | Refractive Index: 1.50 |
| Coefficient of Thermal Expansion: | $87 \times 10^{17}$ in./in./°C. |
| Log Viscosity | Temp., °F. |
| 2.0 | 2370 |
| 2.5 | 2110 |
| 3.0 | 1910 |

EXAMPLE 9

| Ingredient | Percent by Weight |
|---|---|
| $SiO_2$ | 63 |
| $Al_2O_3$ | 5 |
| CaO | 2 |
| MgO | 2 |
| $B_2O_3$ | 14 |
| $Na_2O$ | 12 |
| $F_2$ | 2 |

EXAMPLE 10

| Ingredient | Percent by Weight |
|---|---|
| $SiO_2$ | 64 |
| $Al_2O_3$ | 4 |
| MgO | 4 |
| $B_2O_3$ | 14 |
| $Na_2O$ | 12 |
| $F_2$ | 2 |
| Liquidus: 1556° F. | Refractive Index: 1.50 |
| Log Viscosity | Temp., °F. |
| 2.0 | 2515 |
| 2.5 | 2245 |
| 3.0 | 2030 |

EXAMPLE 11

| Ingredient | Percent by Weight |
|---|---|
| $SiO_2$ | 64.98 |
| $Al_2O_3$ | 5.53 |
| CaO | 2.72 |
| MgO | 0.99 |
| $B_2O_3$ | 12.89 |
| $Na_2O$ | 7.36 |
| $Li_2O$ | 3.68 |
| $F_2$ | 1.84 |
| $SeO_2$ | 0.002 |
| Liquidus: 1930° F. | Refractive Index: 1.50 |
| Coefficient of Thermal Expansion: | $87 \times 10^{17}$ in./in./°C. |
| Log Viscosity | Temp., °F. |
| 2.0 | 2370 |
| 2.5 | 2110 |
| 3.0 | 1910 |

EXAMPLE 12

| Ingredient | Percent by Weight |
|---|---|
| $SiO_2$ | 61 |
| $Al_2O_3$ | 4 |
| MgO | 4 |
| $B_2O_3$ | 16 |
| $Na_2O$ | 12 |
| $F_2$ | 3 |

EXAMPLE 13

| Ingredient | Percent by Weight |
|---|---|
| $SiO_2$ | 62 |
| $Al_2O_3$ | 6 |
| CaO | 3 |
| MgO | 1 |
| $B_2O_3$ | 16 |
| $Na_2O$ | 8 |
| $Li_2O$ | 4 |
| Liquidus: 1698° F. | Refractive Index: 1.50 |
| Log Viscosity | Temp., °F. |
| 2.0 | 2290 |
| 2.5 | 2020 |
| 3.0 | 1810 |

EXAMPLE 14

| Ingredient | Percent by Weight |
|---|---|
| $SiO_2$ | 64.26 |
| $Al_2O_3$ | 5.43 |
| CaO | 2.72 |
| MgO | 0.99 |
| $B_2O_3$ | 12.73 |
| $Na_2O$ | 10.23 |
| $Li_2O$ | 3.63 |
| Liquidus: 1930° F. | Refractive Index: 1.52 |
| Coefficient of Thermal Expansion: | $90 \times 10^{17}$ in./in./°C. |
| Log Viscosity | Temp., °F. |
| 2.0 | 2350 |
| 2.5 | 2090 |
| 3.0 | 1890 |

It has been found that the silica ($SiO_2$) content of the above cladding glasses should not exceed about 65 percent by weight of the composition. Higher amounts of silica result in seed formation which can, as discussed above in relation to core glasses, cause fiber breakage during production.

$Al_2O_3$, $B_2O_3$ and $Na_2O$ are included in the cladding glasses to control liquidus. $LiO_2$ may also be added as a fluxing agent in amounts up to 4 percent. In cases where $LiO_2$ is eliminated (see Examples 9, 10 and 12) it is replaced or substituted for additional $Na_2O$. Thus the collective amounts of $Na_2O$ and $Li_2O$ in the cladding glasses should be within the range of 11–14 percent by weight.

To enhance the durability of and control the refractive index of cladding glasses, CaO and MgO are added. In instances where CaO is eliminated (Examples 10 and 12) it is replaced by MgO. Collectively, CaO and MgO should account for 3.5–4 percent by weight of the cladding glass composition.

Fluorine ($F_2$) may be included in cladding glasses to control the index of refraction and viscosity A small amount of selenium oxide ($SeO_2$) in the cladding glass of optical fibers has been found to be of value in increasing light transmission. The exact reason for this phenomenon is not presently known. Additions of $SeO_2$ in amounts up to 0.004 percent by weight, and preferably from 0.002 to 0.004 percent, have been found effective. Although some cladding glasses will perform equally well with or without $SeO_2$, it may be preferred to add it to cladding glasses as a safeguard.

Any one of the above core glass compositions (Examples 1–7) may be combined with any one of the cladding glass compositions (Examples 8–14) to form optical or light transmitting glass fibers. These fibers, consisting of a composite of the core and cladding glasses, may be produced using conventional glass fiber production techniques. After production, these fibers may be bundled together in any desired number to form a light pipe or fiber optic array.

A preferred combination of core and cladding glasses is the core composition of Example 3 and the cladding composition of Example 11. Optical fibers formed of these glasses have a numerical aperture of 0.56 and a tensile strength of 210,000 p.s.i. More than 60 percent of light entering 5 foot lengths of these fibers will be internally reflected and transmitted out the opposite end. In a 15 foot length, 28 percent of the entering light is transmitted. Comparable properties are attained by the combination of any of the other core and cladding glasses disclosed.

It has been found that if the overall fiber diameter of an individual optical fiber is in the range of 1.5–2.5 mils the fiber possesses desired flexibility and handling characteristics which help eliminate fiber breakage problems. Fibers having a diameter substantially in excess of 2.5 mils have decreased flexibility and consequent high incidence of breakage. Conversely, fibers having a diameter substantially less than 1.5 mils are found to be deficient in transmitting the desired amount of light; this follows from the fact that below 1.5 mils cross-sectional light transmitting area is greatly reduced. Of the preferred 1.5–2.5 mil fiber diameter, about 85–90 percent should be composed of core glass and 10–15 percent cladding glass. Although a cladding glass layer as low as 5 percent of the total fiber diameter has been placed on core glasses, the ability to control such a thin layer and maintain a continuous cladding layer becomes a major problem at commercial fiber production rates. Since any discontinuity of the cladding glass is detrimental to light transmission, it has been found advisable to keep the cladding glass layer at about 10 percent of the overall fiber diameter.

Modifications and variations within the scope of the appended claims are intended to be included.

WE CLAIM:

1. A glass composition having an index of refraction of from 1.56 to 1.64 and capable of transmitting light when in fiber form and surrounded by another glass having a lower index of refraction, said glass composition consisting essentially by weight of:

|  | Percent |
| --- | --- |
| $SiO_2$ | 23–41 |
| $Al_2O_3$ | 7–10 |
| $B_2O_3$ | 2.5–11 |
| $K_2O$ | up to 10 |
| BaO | 34–59 |

2. The glass composition of claim 1 wherein the total amount of $K_2O$ and $B_2O_3$ is from 9.5 to 15.5 percent by weight.

3. The glass composition of claim 1 wherein 0.01–0.05 percent of $Sb_2O_3$ is included therein.

4. The glass composition of claim 1 wherein the total amount of the oxides of Cr, Cu, Fe and Mn is less than 0.05 percent by weight of said glass composition.

5. A glass composition having an index of refraction of about 1.60 and capable of transmitting light when in fiber form and surrounded by another glass having an index of refraction not greater than 1.52, said glass composition consisting essentially by weight of:

|  | Percent |
| --- | --- |
| $SiO_2$ | 30–32 |
| $Al_2O_3$ | 7–8 |
| $B_2O_3$ | 6–7 |
| $K_2O$ | 5–7 |
| BaO | 46–49 |
| $Sb_2O_3$ | 0.01–0.05 |

6. The glass composition of claim 5 wherein the total amount of the oxides of Cr, Cu, Fe and Mn is less than 0.05 percent by weight of said glass composition.

7. A glass composition having an index of refraction of 1.50 to 1.52 and capable of surrounding another glass which is in fibrous form, said glass composition consisting essentially by weight of:

|  | Percent |
| --- | --- |
| $SiO_2$ | 61–65 |
| $Al_2O_3$ | 4–6 |
| CaO | up to 3 |
| MgO | 0.90–4 |
| $B_2O_3$ | 12–16 |
| $Na_2O$ | 7–12 |
| $Li_2O$ | up to 4 |
| $F_2$ | up to 3 |

8. The glass composition of claim 7 wherein the total amount of CaO and MgO is 3.5–4 percent by weight.

9. The glass composition of claim 7 wherein the total amount of $Na_2O$ and $Li_2O$ is 11–14 percent by weight.

10. The glass composition of claim 7 wherein 0.002–0.004 percent by weight of $SeO_2$ is included therein.

11. A glass composition having an index of refraction of about 1.50 and capable of surrounding another glass which is in fibrous form;

said other glass having an index of refraction of 1.56 to 1.64 whereby surrounding said other glass with said glass composition produces a composite optical fiber capable of transmitting light;

said glass composition consisting essentially by weight of:

|  | Percent |
| --- | --- |
| $SiO_2$ | 63–65 |
| $Al_2O_3$ | 5–6 |
| CaO | 2–3 |

Table — Continued

|       |          |
|-------|----------|
| MgO   | 0.50–1   |
| B₂O₃  | 12–14    |
| Na₂O  | 6–8      |
| Li₂O  | 3–5      |
| F₂    | 1–2      |

12. The glass composition of claim 11 wherein 0.002–0.004 percent by weight of SeO₂ is included therein.

13. A light transmitting glass fiber comprising a core glass surrounded by a cladding glass,
said core glass having an index of refraction greater than said cladding glass, and wherein the improvement comprises said core glass consisting essentially by weight of:

|       | Percent  |
|-------|----------|
| SiO₂  | 23–41    |
| Al₂O₃ | 7–10     |
| B₂O₃  | 2.5–11   |
| K₂O   | up to 10 |
| BaO   | 34–59    | and said cladding glass consisting essentially by weight of:

|       | Percent  |
|-------|----------|
| SiO₂  | 61–65    |
| Al₂O₃ | 4–6      |
| CaO   | up to 3  |
| MgO   | 0.90–4   |
| B₂O₃  | 12–16    |
| Na₂O  | 7–12     |
| Li₂O  | up to 4  |
| F₂    | up to 3  |

14. The light transmitting glass fiber of claim 13 wherein said core glass consists essentially by weight of:

|       | Percent  |
|-------|----------|
| SiO₂  | 30–32    |
| Al₂O₃ | 7–8      |
| B₂O₃  | 6–7      |
| K₂O   | 5–7      |
| BaO   | 46–49    | and said cladding glass consists essentially by weight of:

|       | Percent  |
|-------|----------|
| SiO₂  | 63–65    |
| Al₂O₃ | 5–6      |
| CaO   | 2–3      |
| MgO   | 0.50–1   |
| B₂O₃  | 12–14    |
| Na₂O  | 6–8      |
| Li₂O  | 3–5      |
| F₂    | 1–2      |

15. The light transmitting glass fiber of claim 13 wherein said core glass includes 0.01–0.05 percent by weight of Sb₂O₃.

16. The light transmitting glass fiber of claim 13 wherein said core glass contains less than 0.05 percent by weight of the oxides of Cr, Cu, Fe and Mn.

17. The light transmitting glass fiber of claim 13 wherein said core glass includes 0.01–0.05 percent by weight of Sb₂O₃ and contains less than 0.05 percent by weight of the oxides of Cr, Cu, Fe and Mn.

18. The light transmitting glass fiber of claim 13 wherein said cladding glass includes 0.002–0.004 percent by weight of SeO₂.

19. The light transmitting glass fiber of claim 14 wherein said cladding glass includes 0.002–0.004 percent by weight of SeO₂.

20. A light transmitting optical fiber bundle comprising a plurality of the light transmitting glass fibers of claim 13.

21. A light transmitting optical fiber bundle comprising a plurality of the light transmitting glass fibers of claim 14.

22. A light transmitting optical fiber bundle comprising a plurality of the light transmitting glass fibers of claim 17.